April 22, 1941. A. C. HOOF Re. 21,776

COMBINED VEHICLE SPEED AND AUTOMOTIVE ENGINE GOVERNOR

Original Filed Aug. 5, 1937 5 Sheets-Sheet 1

Inventor:
Addison C. Hoof
By Harry H. Hilgeman
Attorney.

April 22, 1941. A. C. HOOF Re. 21,776

COMBINED VEHICLE SPEED AND AUTOMOTIVE ENGINE GOVERNOR

Original Filed Aug. 5, 1937 5 Sheets-Sheet 2

Inventor:
Addison C. Hoof
By Harry H. Hitzeman
Attorney

April 22, 1941. A. C. HOOF Re. 21,776

COMBINED VEHICLE SPEED AND AUTOMOTIVE ENGINE GOVERNOR

Original Filed Aug. 5, 1937 5 Sheets-Sheet 3

Inventor:
Addison C. Hoof
By Harry H. Fitzman
Attorney

April 22, 1941. A. C. HOOF Re. 21,776
COMBINED VEHICLE SPEED AND AUTOMOTIVE ENGINE GOVERNOR
Original Filed Aug. 5, 1937 5 Sheets-Sheet 4
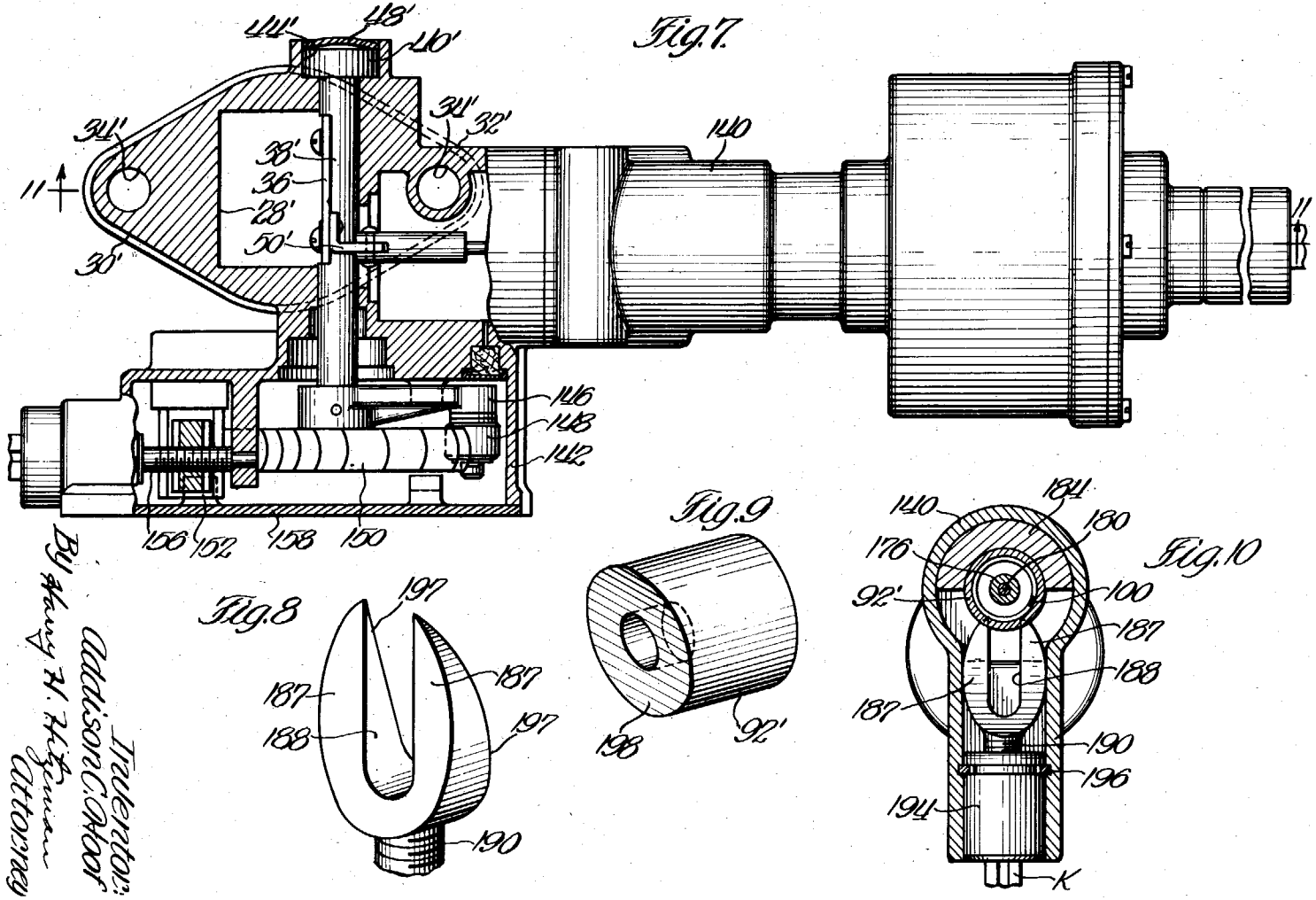
Inventor:
Addison C. Hoof
By Harry H. Hitzeman
Attorney April 22, 1941. A. C. HOOF Re. 21,776

COMBINED VEHICLE SPEED AND AUTOMOTIVE ENGINE GOVERNOR

Original Filed Aug. 5, 1937 5 Sheets-Sheet 5

Inventor:
Addison C. Hoof
By Harry A. Kilgman
Attorney

Reissued Apr. 22, 1941 Re. 21,776

UNITED STATES PATENT OFFICE 21,776

COMBINED VEHICLE SPEED AND AUTOMOTIVE ENGINE GOVERNOR

Addison C. Hoof, Hinsdale, Ill.

Original No. 2,148,556, dated February 28, 1939, Serial No. 157,617, August 5, 1937. Application for reissue August 3, 1940, Serial No. 351,076

20 Claims. (Cl. 180—82.1)

My invention relates to means for governing the road speed of automotive vehicles and similar devices.

Governors or speed control means are in use today upon many thousands of tractors, trucks and other types of automotive vehicles. The principal reasons for their popular use are that they help eliminate accidents by limiting the speed at which a vehicle can be driven, and cut down repair bills and cost of maintenance of equipment because the drivers cannot "race" the motor or ruin it or other parts of the equipment by traveling at an excessive road speed.

There are two general types of governors in use today on automotive equipment. One type is known as a centrifugal governor. This governor includes a plurality of weights mounted radially about a shaft that operates to close a valve mounted in the intake conduit of the internal combustion engine of the vehicle. This valve is usually mounted in the intake conduit between the carburetor and the engine cylinders and upon closing the valve, the engine speed is reduced by reason of the diminished supply of fuel. The shaft upon which the weights are mounted is driven through a flexible shaft or other suitable take-off from the transmission, flywheel or any suitable driven part of the engine or the vehicle. Thus, at a predetermined maximum speed the governor will operate to prevent a higher speed of either the vehicle or the engine. Governors of this general type are shown in Patents No. 1,295,199 and 1,140,060.

The other, and by far the most commercially successful governor, is known as a vacuum or suction controlled governor. This is the type of governor in which a valve member is mounted in a conduit between the intake manifold of the automotive engine and the carburetor. The vacuum produced by the reciprocation of the engine pistons tends to pull the valve to a closed position shutting off the fuel, and either spring means, suction means or combined spring and suction means are used to resist the closing movement. Governors of this general type are shown in Patents No. 1,584,929 and 1,999,758.

Either type of governor above mentioned has its disadvantages, however, and these disadvantages are about the only remaining obstacle against universal adaption of governors for all types of automotive vehicles.

The centrifugal governor is not used in large numbers commercially today for reason which will soon be apparent. The centrifugal governor usually governs the engine's R. P. M. by means of a gear and shaft assembly from the camshaft, crankshaft or other moving part.

Assuming now that on a given automotive vehicle there is a rear axle gear ratio in direct drive of 6.6 to 1. With a certain size tire this would give a speed of 28 M. P. H. at an engine speed of 2000 R. P. M. In third gear the same conditions would give a reduction of gear ratio of 11.15 to 1 and an approximate road speed of 16½ M. P. H. In second speed a total gear reduction of 20.39 to 1, or approximately 9 M. P. H., and in first speed a gear reduction of 42.24 to 1 with a road speed of approximately 4 M. P. H.

If the above mentioned engine and vehicle were governed by a centrifugal governor from the driveshaft take-off or in accordance with the road speed, the control would be as follows: direct drive, 28 M. P. H. or 2000 R. P. M. engine speed; vehicle in third speed at the same miles per hour, would be 3400 R. P. M., in second speed at the same miles per hour, 6200 R. P. M. and in first speed at the same miles per hour, 12,800 R. P. M.

Assuming now that this particular engine is one of the high speed type, capable of delivering its maximum peak horse power at 3800 R. P. M., it is apparent that the engine in second speed and in first speed would be ruined in a very short period of time by the driver of the vehicle. Thus it is apparent that a centrifugal governor operated from the driveshaft takeoff, or operated in accordance with the road speed set at 28 miles per hour, does not in reality govern so as to safeguard the equipment at any other than the speed in direct drive. It will also be seen that if the centrifugal governor is driven in any suitable manner from the engine drive to control the speed of the vehicle in accordance with the revolutions per minute of the engine, and the same were set at 2000 R. P. M., that actually it would govern the speed of the vehicle in direct drive at 28 miles per hour; in third gear at 16½ M. P. H.; in second gear at 9 M. P. H., and in first speed at 4 M. P. H. The above illustrates one of the reasons why centrifugal governors are not used to a greater extent commercially.

One disadvantage of the velocity or vacuum type governor or a mechanical governor resides in the fact that in mountainous territory and upon hilly roads where heavy loads are frequently drawn in trucks or other conveyances, the governor does not permit sufficient speed on the up-hill pulls. For example, with a governor of this type set to control the speed of the vehicle at, say 35 M. P. H., or a R. P. M. of the motor equivalent to 35 M. P. H. in direct drive, it is apparent that in up-hill pulls when it is necessary to shift into an intermediate or the low gear, the governor will slow up the speed of the automobile to an unreasonably low speed. It is thus apparent that with any of the above mentioned governors on the level grade and in going down the hills, the governors will generally work satisfactorily, but for up-hill pulls and especially long ones where the use of intermediate gears are required, governors have met with decided disfavor.

The principal object of the present invention is to provide a governor construction for automotive vehicles which overcomes the disadvantages of both of the types of governors heretofore discussed.

A further object of the present invention is to provide in a single unitary structure a combined centrifugal and suction actuated governor.

A further object of the present invention is to provide in a unitary structure capable of being mounted between the carburetor and the intake manifold of an automotive engine, a dual governor so constructed that the speed of the automotive vehicle is controlled during a portion of the time by means for governing the speed of the automotive vehicle in direct ratio to the revolutions per minute of the engine driving the same in intermediate gears and capable of automatically transferring therefrom at a predetermined speed to a means responsive to the actual road speed of the vehicle.

A further object of the present invention is to provide a dual governor means capable of controlling the maximum speed of a vehicle in direct drive at a predetermined set speed of the vehicle, and in the lower gears at a predetermined number of revolutions per minute of the automotive engine that drives the vehicle.

A further object of the invention is to provide a combined means so constructed that the means that operate independent of each other at predetermined speeds co-operate with each other in placing one or the other in control of the speed of the vehicle.

A further object of the present invention is to provide in combination suction actuated means for governing the speed of the automative vehicle in accordance with the revolutions per minute of the automotive engine and centrifugal or mechanical means co-operating with the same adapted to take over and assume control of the speed of the vehicle whenever a predetermined speed is reached without regard for the revolutions per minute of the automotive engine.

A further object of the invention is to provide a device of the class described that is comparatively simple in operation, highly efficient and capable of long, extensive use without becoming broken or out of order.

Other objects and advantages will be more apparent from the following description wherein reference is had to the accompanying five sheets of drawings upon which Fig. 1 is a fragmentary side elevational view of the forward end of the automotive vehicle, showing the manner in which my improved dual governor is mounted between the carburetor and the intake manifold of the automotive engine;

Fig. 7 is a plan view of a modified form of my improved dual governor with a portion thereof broken in section to generally show the vacuum governor control parts;

Fig. 8 is an enlarged fragmentary view of one of the speed regulating elements;

Fig. 9 is a front perspective view of a co-operating member associated therewith;

Fig. 10 is a vertical sectional view illustrating the same and adjoining parts, and is taken generally on the line 10—10 of Fig. 11;

Figure 1:
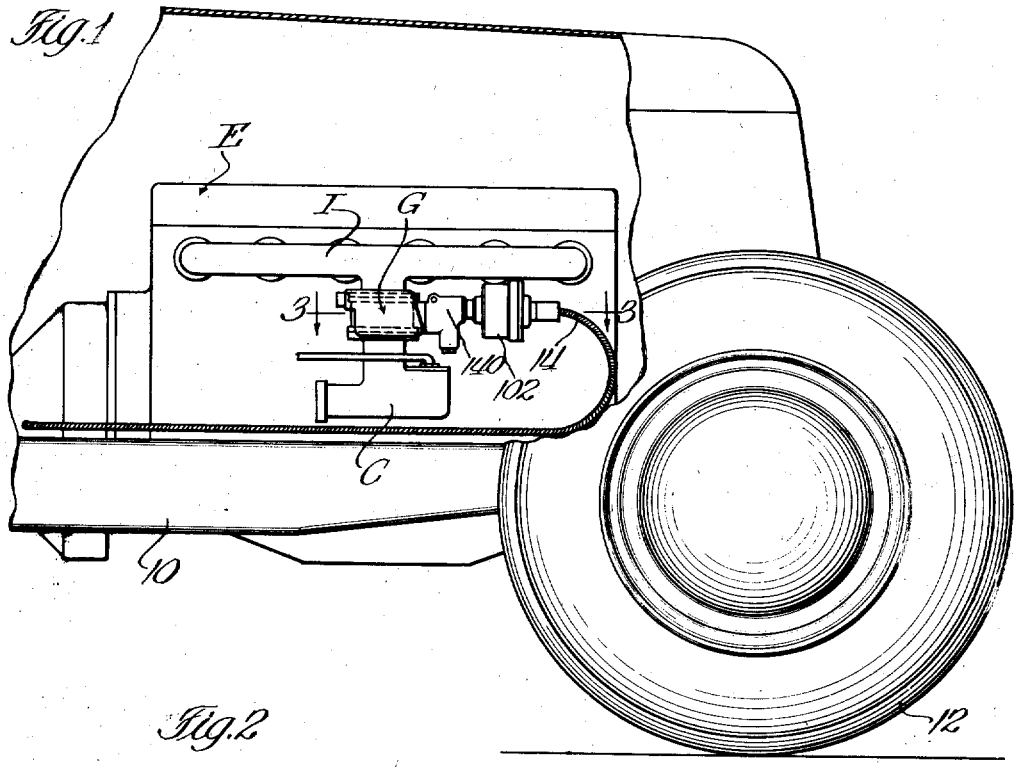

In accordance with the objectives outlined, in Fig. 1 I have shown a vehicle 10 provided with the usual traction wheels 12 and an automotive engine E to provide power for propelling the same. The engine may be of the usual type of internal combustion engine, provided with a supply of fuel that is received by a carburetor C from where it is distributed by means of an intake manifold I to the various cylinders of the engine.

My improved dual governor G is adapted to be mounted in the intake conduit between the carburetor and the intake manifold. By thus mounting the governor it will be apparent that the same can be used with either a downdraft carburetor or an updraft carburetor such as shown. The only difference in the constructions would lie in the location of and the direction in which the governor valve would be swung toward closing position. The governor is provided with a flexible shaft 14 which may be connected in a suitable driving manner to the driveshaft of the automobile. In this manner there will be a direct driving connection between the centrifugal governor and the means for driving the automobile irrespective of whether the automotive engine is geared to the driving wheels of the automobile through the high, intermediate, low or reverse gears.

Figure 3:
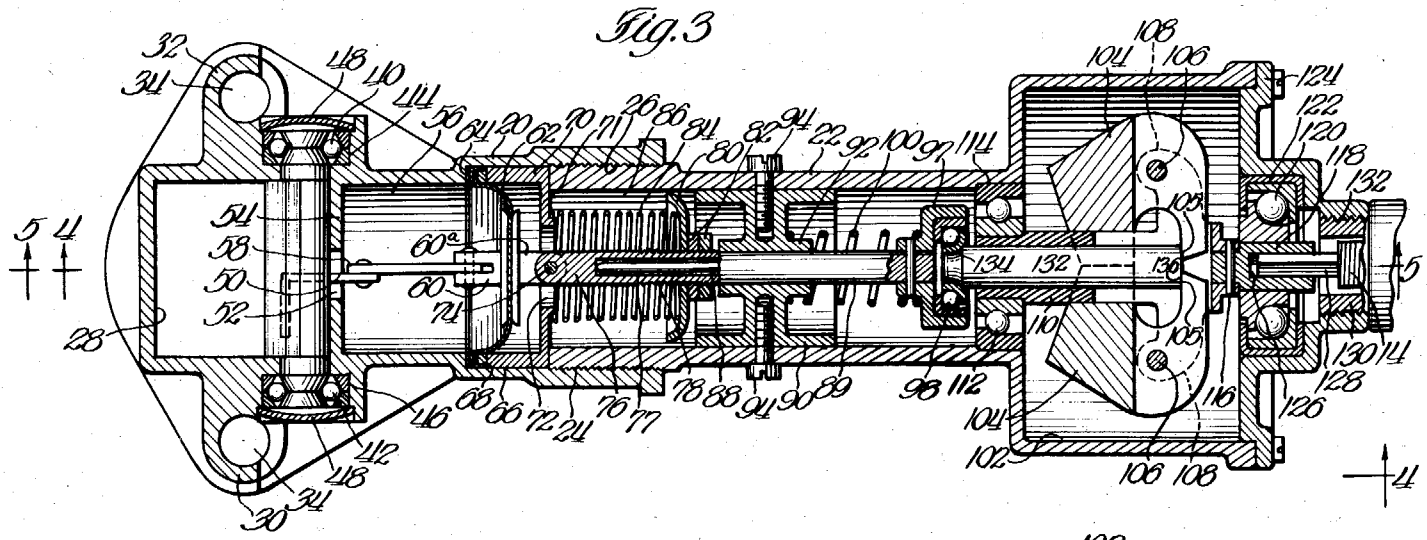
Fig. 3 is a plan sectional view through the preferred form of my invention and is taken generally on the line 3—3 of Fig. 1.

Referring now to Fig. 3, the governor G may generally comprise a pair of housing members 20 and 22. The member 22 may be formed with an open end 24, as shown, to receive the screw threaded end 26 of the housing member 22. The housing 20 may be formed with a vertical passageway 28 of a shape and size to correspond to that of the intake conduit of the automotive engine E. I provide a pair of flanges 30 and 32 with suitable bolt holes 34 so that the housing 20 may be suitably clamped between a flange on the carburetor C and a flange on the intake conduit I. The valve plate 36, comprising the governor valve for my dual governor, is a rectangular plate that is securely mounted upon a cross-shaft 38 disposed within the conduit 28. The shaft 38 may have its ends suitably journaled in ball bearing members 40 and 42 that are mounted in the openings 44 and 46 in the housing 20. Suitable cap members 48 seal the openings in which the ball-bearings are located.

An arm 50 may be secured to the back side of the valve plate 36 and extend inwardly through an opening 52 in a wall 54 separating the conduit 28 from the chamber 56 in the housing 20. The arm 50 may be pivotally connected by a suitable pin to a link 58 that is in turn pivotally connected to the extended end of a rod member 60.

The rod member 60 may be rigidly fastened to a flexible diaphragm 62 that is securely anchored about its outer edge between a shoulder 64 at one end of an enlarged chamber 66 and the annular edge 68 of a shell member 70 positioned in the chamber 66. The shell member 70 is formed with a central opening 72 through which a rod member 60a, rigidly connected to the diaphragm 62, is adapted to be extended. The end of the rod member 60a may be pivotally connected by a pin 74 to an operating rod 76. The rod 76 may extend forward and be formed with the screw-threaded end portion 78. A spring cap 80 and a pair of lock nuts 82 are adapted to be screw-threadedly mounted upon the threaded end of the rod in a desired position. A compression spring 84, of a desired tension, may be mounted between the spring cup 80 and the vertical wall 71 of the shell member 70.

As thus far described, it can be seen that the governor valve 36 is capable of movement upwardly or toward a closing position under the suction of the engine cylinders, being opposed only by the compression spring 84. The diaphragm 62 and compression spring assembly, as described, are all positioned in the housing 20 with the extended end 24 of the housing 22 holding the shell member 70 fixedly in position to firmly hold the diaphragm in place. The spring member and spring cup are thus positioned in the forward end of the cylindrical chamber 86 of the housing 22. The rod 76 is formed with an axial drill opening 77 within which the reduced end of a push rod 89 is positioned. The push rod 89 is journalled in a bearing member 90 formed with an elongated hub portion 92 and provided with a pair of adjusting screws 94 that pass through diagonally extended openings 96 in the housing 22 so that the bearing may be adjusted forward or back. The push rod 89 has a ballbearing housing 97 at its opposite end within which a thrust bearing 98 is mounted. A compression spring 100, positioned between the bearing 90 and the bearing housing 97, normally holds the push rod 89 in the position shown in the drawings.

The centrifugal governor assembly may be mounted in an enlarged chamber 102 in the end of housing 22. This assembly may include the weight members 104 mounted on the pivots 106 in the ends of arms 108 secured to a hollow shaft 110. The shaft 110 may be journalled at one end in a suitable ballbearing member 112 positioned in a socket 114 in the end of chamber 86, and connected at its opposite end by means of a pin member 116 to a stub shaft 118. The shaft 118 is journaled in a suitable ballbearing member 120 mounted in a socket 122 in a cover plate 124 closing the open end of chamber 102. The stub shaft 118 may be provided with a square axial opening 126 to receive the squared tip 128 of the flexible driveshaft 14. A suitable flexible shaft housing connector 130 may screw-threadedly engage a tapped complementary opening 132 in the cover 124. The hollow shaft 110 may have a pin member 132 mounted therein with one end rounded as shown at 134, to engage in the thrust bearing 98 and the other end squared, as shown at 136, to engage the finger portions 105 of the weight members 104.

Figure 4:
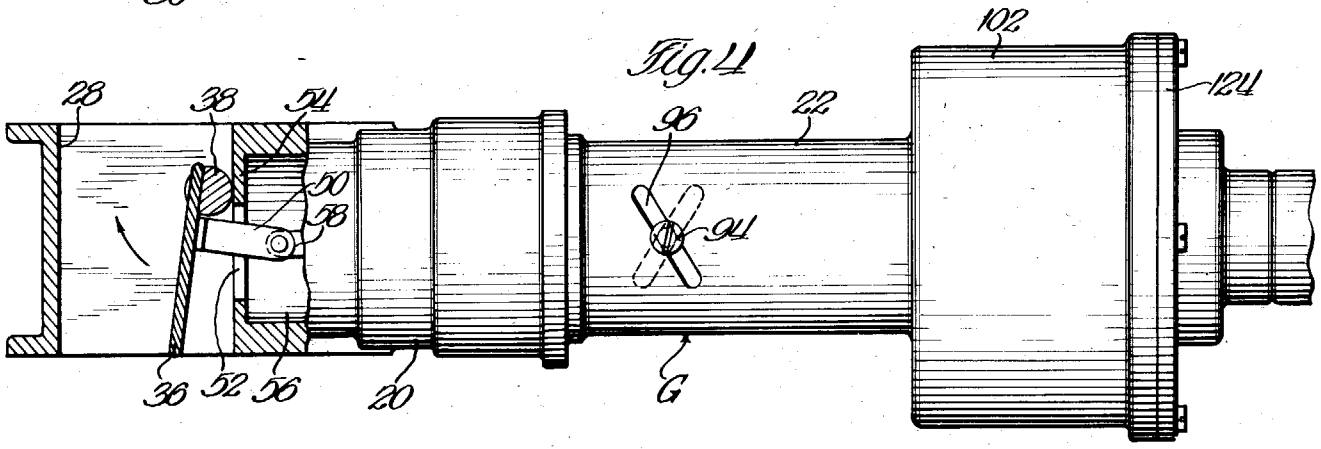
Fig. 4 is a side elevational view of my improved dual governor shown in Fig. 3 with a portion thereof broken in section, as indicated generally by the line 4—4 of Fig. 3.

The operation of the dual governor will now be described. Assuming that the governor unit G may be mounted in the position shown in Fig. 4 between the carburetor and the intake manifold of the engine; and assuming further that the centrifugal governor means, including the weight members 104, have been calibrated to operate at a road speed of 28 M. P. H.; and assuming further that the suction operated governing means, including the compression spring 84, have been calibrated to operate the governor valve at an engine speed of 2800 revolutions per minute, through the flexible shaft 14, the hollow shaft 110 which carries the weight members 104 will be revolved in the bearing provided, in proportion to the road speed of the vehicle after the same starts traveling.

Figure 5:
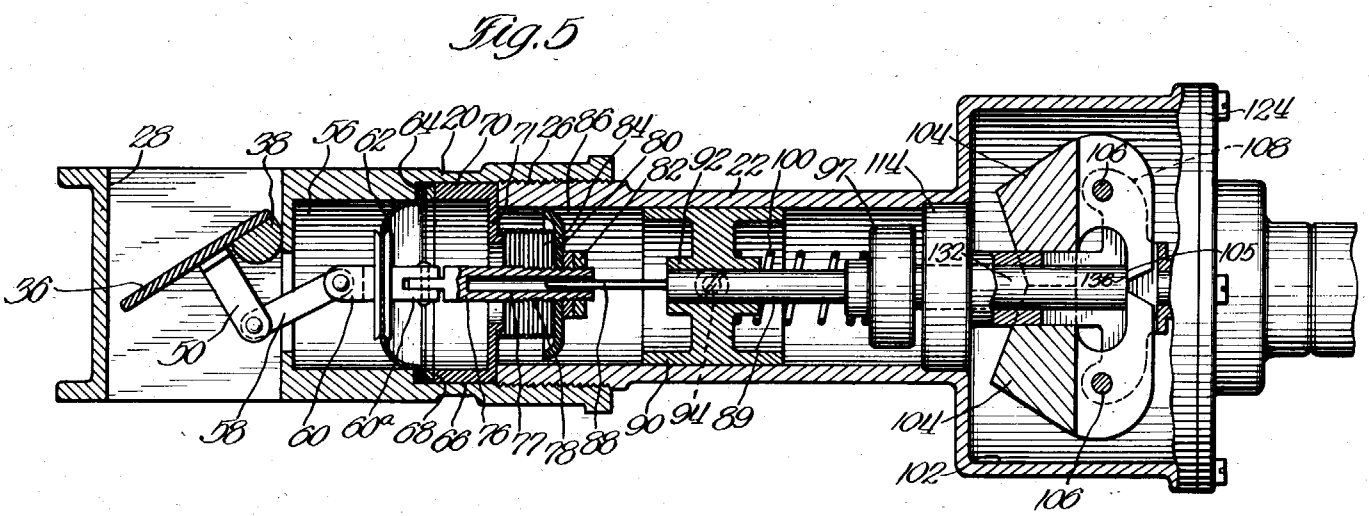
Fig. 5 is a cross-sectional view taken generally on the line 5—5 of Fig. 3, but showing the parts in changed position with the suction actuated governor controlling the valve.

Assuming now that the engine is accelerated, as soon as the engine R. P. M. reaches 2800, the suction through conduit 28 will swing the valve 36 to a closed position against the resistance of spring 84. The suction created in chamber 86 will cause the diaphragm to move to the position shown in Fig. 5, thus assisting in the closing movement of the valve. The suction actuated governor therefore, in any of the lower speeds or even while the vehicle is standing still, completely controls the R. P. M. of the engine and absolutely prevents the same from running faster than the speed for which the governor is set.

After the vehicle has been set in motion and is running in direct drive, its speed may gradually approach 28 miles per hour. In direct drive at 28 miles per hour the R. P. M. of the engine is perhaps 2000, so the vacuum operated governor means described will have no effect on the engine or the road speed.

Figure 6:
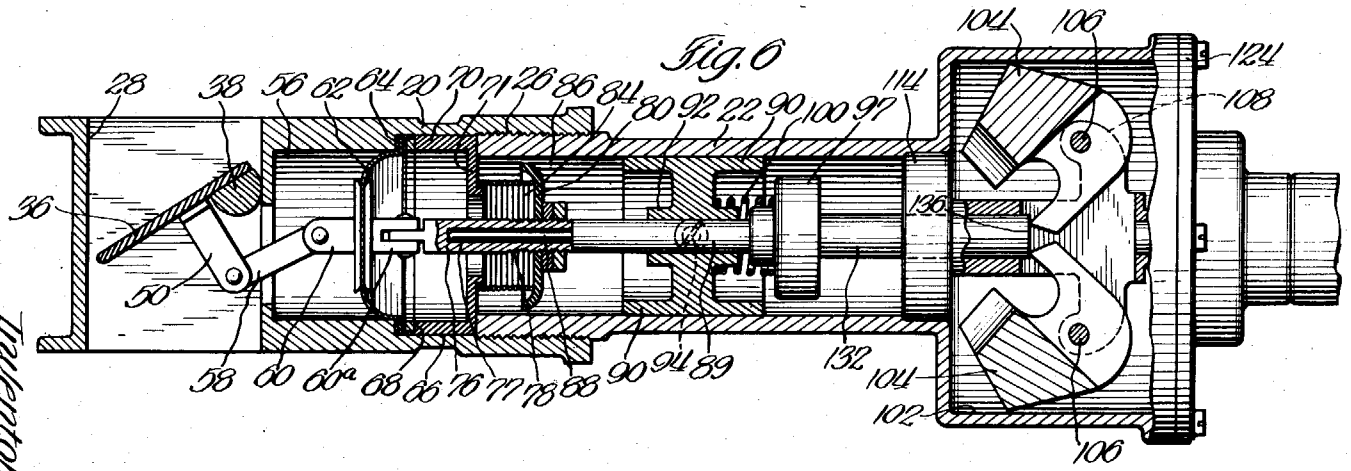
Fig. 6 is a similar cross-sectional view taken on the same line but showing the parts in changed position with the centrifugal governor controlling valve.

As previously mentioned, the centrifugal governing members have been so calibrated that at a road speed of 28 M. P. H. the weights will fly outwardly on their pivots 106, and by means of the fingers 105 move the rod 132 forward, engaging the end of push rod 89, and through rod 76, 60 and link 58 bring the offset valve 36 to a closed position, thus effectively preventing a greater road speed than 28 M. P. H. This condition is shown in Fig. 6.

From the foregoing description of the actual operation of the dual governor, it can thus be seen that the ideal governing functions are provided; a control for the engine and a maximum speed control for the road speed of the vehicle.

Figures 11, 12, 13:
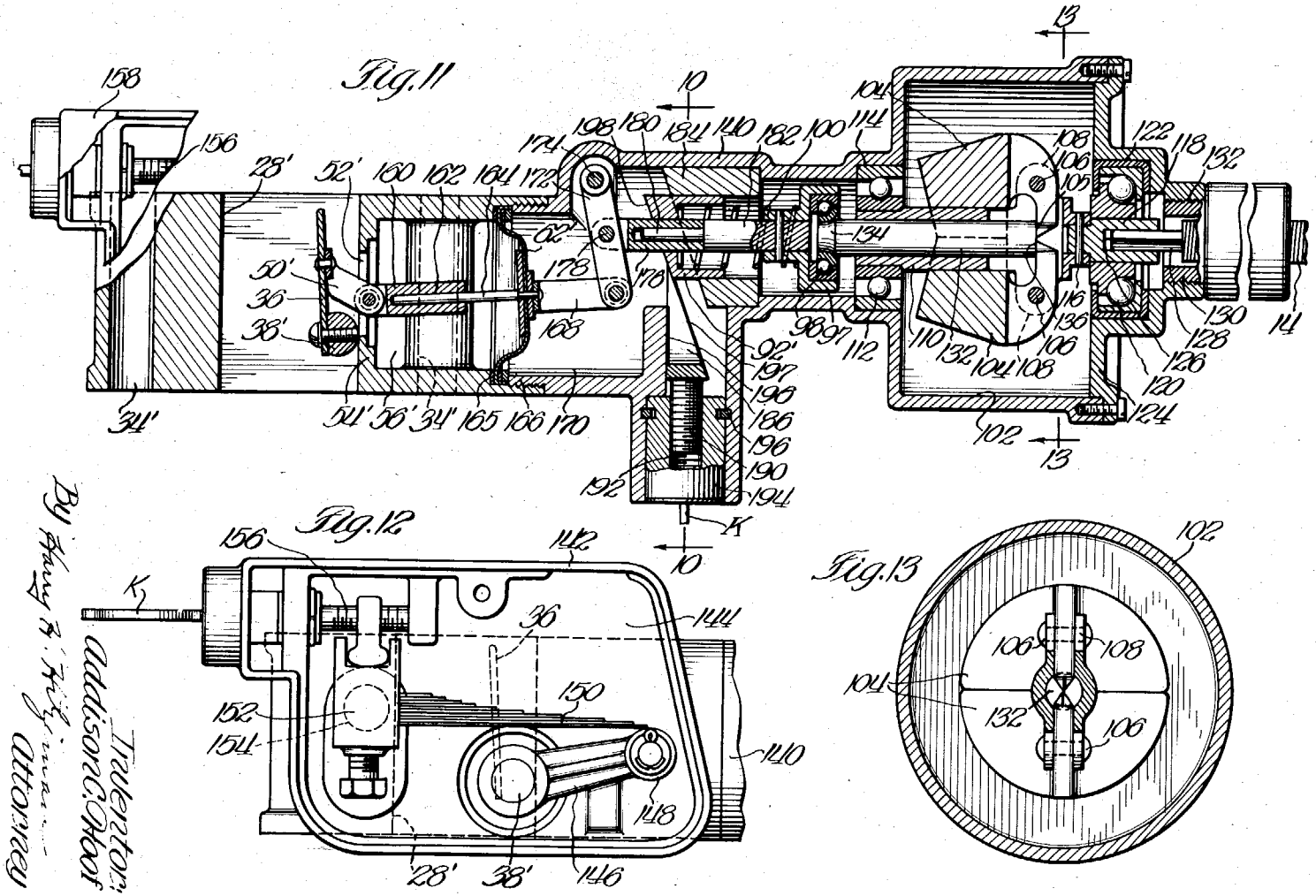
Fig. 11 is a longitudinal sectional view of the modified form of governor shown in Fig. 7, and is taken generally on the line 11—11 of Fig. 7.
Fig. 12 is a fragmentary elevational view of the vacuum control governor parts.
Fig. 13 is a vertical sectional view showing the centrifugal governor parts, and is taken generally on the line 13—13 of Fig. 11.

In Figs. 7 to 13 inclusive, I have shown a modified form of dual governor wherein the suction actuated means are located in a compartment or housing generally at right angles to the actuated rod of the centrifugal governor. Thus, as shown in Figs. 7 and 11, I have provided a governor unit G with a pair of housings 140 for the centrifugal governor means and an offset housing 142 for the suction actuated governor means. I have shown the housing 140 formed at its forward end with a vertical passageway 28' of a shape and size to correspond to that of the intake conduit of the automotive engine E. I have provided the flanges 30' and 32' with suitable bolt holes 34' so that the housing 140 may be suitably clamped between a flange and the carburetor C and a flange on the intake conduit I. The valve plate 36, comprising the governor valve for the dual governor, is a rectangular plate that is securely mounted upon a cross-shaft 38' disposed within the conduit 28'. The shaft 38' may have one end suitably journalled in a ballbearing member 40' mounted in the opening 44' of the housing 140. A cap member 48' may seal the opening in which the ballbearing is located.

The opposite end of shaft 38' may extend into chamber 144 in the housing 142 and have a crank arm 146 rigidly secured to the end thereof. The arm 146 may carry a roller 148 adapted to engage the extended end of a cantilever spring member 150 secured at its opposite end in a block 152. The block 152 is mounted for rotation upon a stud 154 and may be adjusted to a desired angular position by the key control adjusting means 156. A suitable cover plate 158 encloses the mechanism described and contained in the housing 142. All of this mechanism may be generally similar to that shown in my United States Patent No. 1,999,758.

An arm 50', similar to that heretofore described in connection with the preferred embodiment, may be attached to the back side of the valve plate 36 and extend inwardly through an opening 52' in a wall 54' supporting the conduit 28' from the chamber 56' in the forward end of housing 140. The arm 50' may be pivotally connected by a suitable pin to a link 160 that is formed with an axial drilled opening 162. An elongated pin member 164 is adapted to be telescopically mounted in opening 162 and connect at one end with the flexible diaphragm 62' that is anchored about its outer edge between a shoulder 165 at one end of chamber 56' and an annular edge 166 of the rear portion of the housing 140. The pin member 164 and diaphragm 62' may have an arm 168 rigidly connected thereto and extending into the chamber 170 in the housing 140. The link 168 may be pivotally connected to a rotatable arm 172 that is pivoted at one end upon a pin member 174. I form a rod 176 with a slotted end to receive the arm 172 and pivotally connect the same with a pin member 178. The arm 176 is axially drilled at its opposite end to telescopically receive a reduced end 180 of an actuating rod 182. The actuating rod 182 is provided with a spring 100, ballbearing housing 97 and other parts similar to that shown in Fig. 3, and accordingly like numbers will be applied to the like parts in this embodiment.

The bearing 92' for the coil spring 100 is adapted to be movably mounted in a collar 184 by an adjusting yoke 186. The adjusting yoke may have a pair of bifurcated ends 187 and an elongated slot 188 to straddle the rod member 176. For adjusting the same to increase or decrease the tension on spring 100, I provide a screw-threaded rod section 190 which engages in a tapped opening 192 in a plug member 194. The member 194 is preferably held against lateral movement by a split spring washer 196 engaging a groove in the same and in the wall of the housing, thus locking the plug in position but permitting rotation of the same. In this manner a key K or any other suitable device may be inserted into a suitable opening in the end of the plug and the same may be rotated to move the adjusting yoke 186 forward or back to secure the desired tension on the spring 100. It will be obvious that the yoke will slide upon the flat wall portion 196 of the housing and have its sloping face 197 engage the complementary face 198 of the bearing 92'.

With the embodiment of the invention as thus shown and described, it will be apparent that the action of the combined governing members will be similar to that previously described. The suction actuated governor will quite obviously respond to the suction in conduit 28' to open or close the valve 36 in direct relation to the revolutions per minute of the automotive engine. The diaphragm 62' will assist in this action by reason of the suction created in chamber 56' by the engine. The calibrated cantilever spring member 150 and associated parts will prevent closure of the valve except at the predetermined desired R. P. M. of the engine. In view of the fact that the cantilever spring can be calibrated to meet the curve effort or valve torque curve of the automotive engine, it can be seen that the suction actuated valve will correspond to the control desired.

In the event that the vehicle is travelling at a road speed which approaches 28 M. P. H., or any other road speed at which the centrifugal governor is set to operate, it will be obvious that the centrifugal weights will push forward on the rod 132 and actuating rod 182 and through the lever 172 and rigid connection of the arm 168 and pin 164 move the valve to closed position. Since the pin 164 is also adapted to push forward in the rod 160, it can be seen that the suction actuated governor will work without any interference from the centrifugal governor operating means. Likewise, when the flexible diaphragm 62' is sucked forward by the pressure vacuum in chamber 56', the lever 172 will swing on its pivot 174 and cause a partial withdrawal of the pin 180 from the rod 176.

Figure 2:
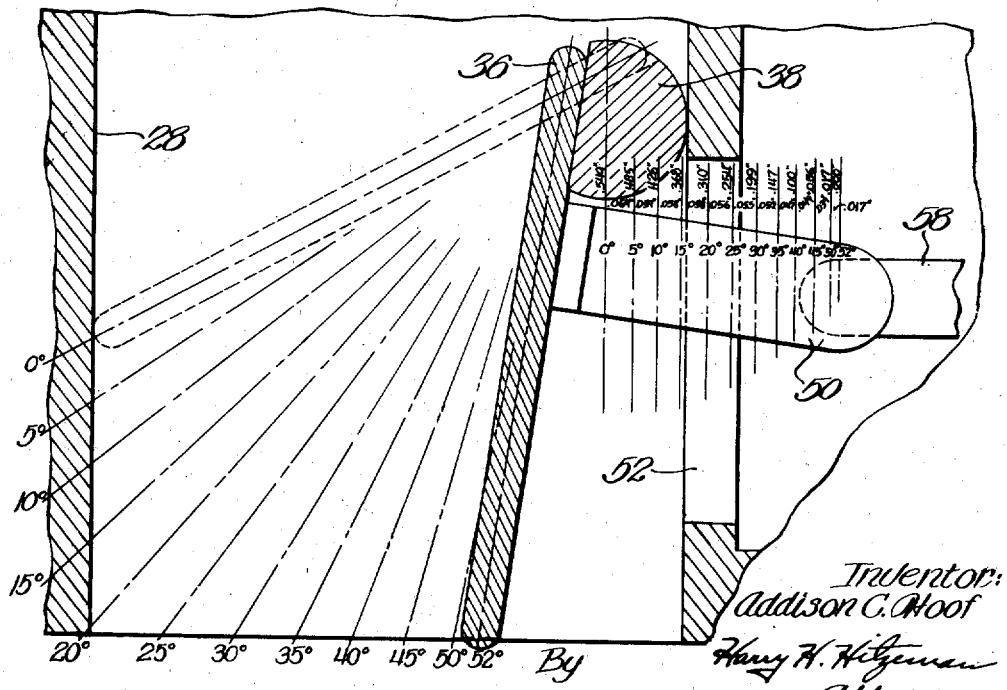
Fig. 2 is an enlarged, generally diagrammatic view showing the range of movement of the governor valve and the amount of pounds pressure required for the various increments of closing movement.

In Fig. 2, I have shown in enlarged detail the purpose of having an offset arm attached to the rear of the valve plate and the manner in which the same may cooperate with the compression spring 84 to give a satisfactory suction actuated control at lower or maximum R. P. M. control for which the same is set, regardless of the load which may be placed upon the engine sought to be governed.

Since the vacuum in the intake of an internal combustion engine on the cylinder side of the valve increases very rapidly as the valve moves to a closed position, a spring or similar yielding device which offers a gradually increasing resistance as it is deformed, will not operate satisfactorily to meet the accelerated rate of increase of the vacuum. Therefore suction actuated governors of the type mentioned can not be directly balanced by a spring at all positions of the valve without providing compensating means to generally provide a resistance curve opposing the closing of the valve, generally similar, if not identical, with the valve torque curve or the torque curve of the suction acting to close the valve.

In the present governor I effect this compensating means by the use of the offset arm 50 connected by the link 58 to the rod member 60 which is operatively connected with the compression spring 84. In order to illustrate the manner in which the angularly disposed arm member and linkage combine with the spring to give an unequal resistance at the various closing positions, I have shown in the drawings 5° movements of the valve plate and the pounds pressure of the torque of the engine moving the same toward closing position. This diagrammatic view also shows the increments of movement of the pivot between the arm 50 and the link 58, and it will be noted that the first 2° movement of the valve cause only .017 of an inch movement of the end of the arm; the next 5°—.039 of an inch; the next 5°—.049 of an inch; the next 5°—.047 of an inch; the next 5°—.052 of an inch, and so on until the last 5° of movement of the valve effect a movement of the end of the arm of .064 of an inch. From the above it will be seen that the actual forward pull upon the spring is graduated to generally meet the accelerated rate of vacuum increase. It will be noted that at the beginning of movement of the valve very little pressure and very little movement is necesary, whereas approaching the closing position of the valve considerably more movement and proportionately, considerably more pressure is needed.

The foregoing will illustrate how applicant has effected one means of utilizing a spring member in connection with an offset arm or lever to meet the torque curve of the automotive engine. In the modified form of the invention wherein the cantilever spring is employed in direct contact with the valve shaft, it is of course understood that the cantilever spring leaves are graduated upon assembly and the spring ensemble contains a resistance unit which meets the curve of effort of the motor.

From the above and foregoing it will be apparent that I have provided a governor which meets and overcomes all of the present day objections to governors. It is obvious that changes in details of construction may be easily made without departing from the spirit of the invention. The generic thought that applicant has presented is the provision of two individual and separate governing means to control the engine's R. P. M. and the road speed of the vehicle and to cooperate with each other to in this manner effect a complete governing of the vehicle.

While I have shown and described this combination as including a suction actuated governor and a centrifugal governor, it will be obvious that I do not wish to be limited to this exact disclosure. Other types of mechanical governors may be substituted and the invention contemplates the provision of any combination of suitable governors to accomplish the results desired. What I desire to secure and protect by Letters Patent of the United States is:

1. A governor for controlling the speed of an internal combustion engine driven automotive vehicle which has a fuel conduit between the carburetor and the intake manifold of the engine, said governor including a valve in said fuel conduit and mechanical means acting on said valve adapted to control the supply of fuel to said engine in accordance with the road speed of said vehicle at a given speed and suction responsive means acting on said valve and operable independent of said mechanical means and adapted to control the supply of fuel to said engine at a given engine speed.

2. Dual governing means for controlling the speed of an engine driven automotive vehicle comprising centrifugal governor means adapted to operate a valve to control the supply of fuel to said engine in accordance with the road speed of said vehicle at a given speed and suction responsive governor means operable independent thereof adapted to operate a valve to control the supply of fuel to said engine at a given engine speed, both of said governor means comprising a unitary structure and capable of actuating the same control valve.

3. Dual governing means for controlling the speed of an engine driven automotive vehicle by controlling the R. P. M. of the engine at different speeds when the engine is in direct drive connection and when it is in an intermediate drive connection including a housing adapted to be inserted between the carburetor and the intake manifold of the engine, a conduit through said housing permitting fuel flow from said carburetor to the intake manifold of said engine, a pivotally mounted valve member in said conduit, means associated with said valve member for moving the same to closed position at a predetermined road speed of said vehicle, and calibrated spring means associated with said valve and adapted to prevent closing of said valve at any other than a predetermined R. P. M. of said automotive engine in the intermediate speeds.

4. Dual governing means for controlling the speed of an engine driven automotive vehicle by controlling the R. P. M. of the engine at different speeds when the engine is in direct drive connection and when it is in an intermediate drive connection including a housing adapted to be inserted between the carburetor and the intake manifold of the engine, a conduit through said housing permitting fuel flow from said carburetor to the intake manifold of said engine, a pivotally mounted valve member in said conduit, means associated with said valve member for moving the same to closed position at a predetermined road speed of said vehicle, said means including a centrifugal device geared to the direct drive, and calibrated spring means associated with said valve and adapted to prevent closing of said valve at any other than a predetermined R. P. M. of said automotive engine in the intermediate speeds.

5. Dual governing means for controlling the speed of an engine driven automotive vehicle by controlling the R. P. M. of the engine at different speeds when the engine is in direct drive connection and when it is in an intermediate drive connection including a housing adapted to be inserted between the carburetor and the intake manifold of the engine, a conduit through said housing permitting fuel flow from said carburetor to the intake manifold of said engine, a pivotally mounted valve member in said conduit, means associated with said valve member for moving the same to closed position at a predetermined road speed of said vehicle, said means including a centrifugal device geared to the direct drive and an operating rod associated therewith and connected to said valve member, and calibrated spring means associated with said valve and adapted to prevent closing of said valve at any other than a predetermined R. P. M. of said automotive engine in the intermediate speeds.

6. Dual governing means for controlling the speed of an engine driven automotive vehicle, the engine having a manifold, a carburtor and a fuel conduit from said carburetor to said manifold, said means including a valve in said fuel conduit, a mechanical governor means adapted to control the maximum road speed in direct drive and suction actuated governor means adapted to control the maximum R. P. M. in all other gears both said mechanical governor means and said suction actuated means having operative connection with the valve in said fuel conduit.

7. Dual governing means for controlling the speed of an engine driven automotive vehicle by controlling the R. P. M. of the engine at different speeds when the engine is in direct drive connection and when it is in an intermediate drive connection including a housing adapted to be inserted between the carburetor and the intake manifold of the engine, a conduit through said housing permitting fuel flow from said carburetor to the intake manifold of said engine, a pivotally mounted valve member in said conduit, means associated with said valve member for moving the same to closed position at a predetermined road speed of said vehicle, and calibrated cantilever spring means associated with said valve and adapted to prevent closing of said valve at any other than a predetermined R. P. M. of said automotive engine in the intermediate speeds.

8. A dual governor comprising forward and back housing members screw-threadedly connected to form a continuous housing, a vertical fluid conduit through the front end of said forward housing, a reciprocal valve in said conduit, an arm connected to said valve and extending into said forward housing, a valve actuating rod connected thereto, said valve adapted to be moved to closed position by suction in said conduit, spring means associated with said actuating rod opposing closing movement of said valve and a centrifugally actuated device supported in said back housing and having operative engagement with said valve actuating rod and capable of moving the same forward.

9. A dual governor comprising forward and back housing members screw-threadedly connected to form a continuous housing, a vertical fluid conduit through the front end of said forward housing, an offset valve pivotally mounted in said conduit, an arm connected to said valve and extending into said forward housing, a valve actuating rod connected thereto, said valve adapted to be moved to closed position by suction in said conduit, spring means associated with said actuating rod opposing closing movement of said valve, a centrifugally actuated device supported in said back housing and having operative engagement with said valve actuating rod and capable of moving the same forward, and spring means for normally preventing movement of said valve actuating rod by said centrifugally actuated device.

10. A dual governor comprising forward and back housing members screw-threadedly connected to form a continuous longitudinally disposed housing, a vertical fluid conduit through the front end of said forward housing, a reciprocal valve in said conduit, an arm connected to said valve and extending into said forward housing, a valve actuating rod connected thereto, said valve adapted to be moved to closed position by suction in said conduit, spring means associated with said actuating rod normally opposing closing movement of said valve, and a centrifugally actuated device supported in said back housing and having operative engagement with said valve actuating rod and capable of moving the same forward, said device including a rod axially aligned with and abutting said actuating rod and guide means therefor in said back housing.

11. A dual governor comprising forward and back housing members, screw-threadedly connected to form a continuous longitudinally disposed housing, a vertical fluid conduit through the front end of said forward housing, a reciprocal valve in said conduit, a valve actuating rod connected thereto and extending into said forward housing, said valve adapted to be moved to closed position by suction in said conduit, spring means associated with said actuating rod normally opposing closing movement of said valve, and a centrifugally actuated device supported in said back housing and having operative engagement with said valve actuating rod and capable of moving the same forward, said device including a rod axially aligned with and abutting said actuating rod and guide means therefor in said back housing.

12. A dual governor comprising forward and back housing members screw-threadedly connected to form a continuous longitudinally disposed housing, a vertical fluid conduit through the front end of said forward housing, a reciprocal valve in said conduit, an arm connected to said valve and extending into said forward housing, a valve actuating rod connected thereto, a flexible diaphragm fixedly mounted in said forward housing adjacent said fluid conduit forming a seal between said fluid conduit and said housing members, said rod extending axially through said diaphragm, said valve adapted to be moved to closed position by suction in said conduit, spring means associated with said actuating rod normally opposing closing movement of said valve, and a centrifugally actuated device supported in said back housing and having operative engagement with said valve actuating rod and capable of moving the same forward, said device including a rod axially aligned with and abutting said actuating rod, and guide means therefor in said back housing.

13. A dual governor comprising a forward and a back housing member screw-threadedly connected to form a continuous housing, a vertical fluid conduit through the front end of said forward housing, a reciprocal valve in said conduit, a flexible wall separating said fluid conduit from the balance of said housing, an arm connected to said valve and extending through said flexible wall into said forward housing, a valve actuating rod connected thereto, said valve adapted to be moved to closed position by suction in said conduit, spring means associated with said actuating rod opposing closing movement of said valve and a centrifugally actuated device supported in said back housing and having operative engagement with said valve actuating rod and capable of moving the same forward.

14. A dual governor comprising an elongated housing, a vertical fluid conduit through the front end of said housing, a valve shaft therein adjacent one wall of said conduit, a reciprocal valve on said shaft in said conduit, an arm connected to the back of said valve and extending into said forward housing, a valve actuating rod connected thereto, said valve adapted to be moved to closed position by suction in said conduit, calibrated spring means associated with said valve shaft opposing closing movement of said valve under all except a predetermined suction, and a centrifugally actuated device supported in said back housing and having operative engagement with said valve actuating rod and capable of moving the same forward.

15. Dual governing means for controlling the speed of an engine driven automotive vehicle by controlling the R. P. M. of the engine at different speeds when the engine is in an intermediate drive connection and by controlling the road speed of the vehicle when the engine is in direct drive connection including a housing adapted to be inserted between the carburetor and the intake manifold of the engine, a conduit through said housing permitting fuel flow from said carburetor to the intake manifold of said engine, a valve shaft in said conduit adjacent one wall thereof, a pivotally mounted valve member on said shaft in said conduit, means associated with said valve member for moving the same to closed position at a predetermined road speed of said vehicle, and calibrated spring means associated with said valve shaft adapted to prevent closing of said valve at any other than a predetermined R. P. M. of said automotive engine in the intermediate speeds.

16. Dual governing means for controlling the speed of an engine driven automotive vehicle by controlling the R. P. M. of the engine at different speeds when the engine is in an intermediate drive connection and by controlling the road speed of the vehicle when the engine is in direct drive connection including a housing adapted to be inserted between the carburetor and the intake manifold of the engine, a conduit through said housing permitting fuel flow from said carburetor to the intake manifold of said engine, a valve shaft in said conduit adjacent one wall thereof, a pivotally mounted valve member on said shaft in said conduit, means associated with said valve member for moving the same to closed position at a predetermined road speed of said vehicle, and calibrated spring means associated with said valve shaft adapted to prevent closing of said valve at any other than a predetermined R. P. M. of said automotive engine in the intermediate speeds, said spring means being a cantilever spring and key-controlled means for adjusting the position of the same.

17. Dual governing means for controlling the speed of an engine driven automotive vehicle by controlling the R. P. M. of the engine at different speeds when the engine is in direct drive connection and when it is in intermediate drive connection, including a housing adapted to be inserted between the carburetor and the intake manifold of the engine, a conduit through said housing permitting fuel flow from said carburetor to the intake manifold of said engine, a pivotally mounted valve member in said conduit, means associated with said valve member to control the supply of fuel to said engine in accordance with the road speed of said vehicle at a given speed in direct drive and suction responsive means associated with said valve and adapted to prevent closing of said valve at any other than a predetermined relatively high R. P. M. of said automotive engine in the intermediate speeds.

18. Dual governing means for controlling the speed of an engine driven automotive vehicle, the engine having a manifold, a carburetor and a fuel conduit from said carburetor to the manifold, said means including a valve in said fuel conduit, a governor means adapted to control the maximum road speed in direct drive and suction actuated governor means adapted to control the maximum R. P. M. in all other gears, said first governor means and said suction actuated means being operatively associated with the valve in said fuel conduit.

19. A device for controlling the speed of an engine driven automotive vehicle by controlling the R. P. M. of the engine at different speeds when the engine is in direct drive connection and when it is in intermediate drive connection, including a housing adapted to be inserted in the intake manifold of the engine, a conduit through said housing for controlling fuel flow to the intake manifold of said engine, a pivotally mounted valve member in said conduit, governor means operatively associated with said valve member and including means responsive to suction effect and operative to cause the governor means to control the valve for maintaining a predetermined relatively high governed engine speed in intermediate gear range, said governor means further including means operative to cause the governor means to control the valve in accordance with road speed at a given speed when in relatively high gear, said road speed corresponding to a relatively low engine speed.

20. A device of the class described in claim 19 wherein said means responsive to suction effect includes a calibrated spring.

ADDISON C. HOOF.